US012196009B2

(12) United States Patent
Huber (10) Patent No.: US 12,196,009 B2
(45) Date of Patent: Jan. 14, 2025

(54) LOCKABLE CLAMPING DEVICE

(71) Applicant: Joseph Huber, Chandler, AZ (US)

(72) Inventor: Joseph Huber, Chandler, AZ (US)

(*) Notice: Subject to any disclaimer, the term of this patent is extended or adjusted under 35 U.S.C. 154(b) by 196 days.

(21) Appl. No.: 17/892,093

(22) Filed: Aug. 21, 2022

(65) Prior Publication Data

US 2023/0066788 A1  Mar. 2, 2023

Related U.S. Application Data

(60) Provisional application No. 63/334,253, filed on Apr. 25, 2022, provisional application No. 63/237,846, filed on Aug. 27, 2021.

(51) Int. Cl.
*E05B 73/00* (2006.01)
*E05B 67/00* (2006.01)
*F16B 2/06* (2006.01)

(52) U.S. Cl.
CPC .............. *E05B 73/00* (2013.01); *E05B 67/00* (2013.01); *F16B 2/06* (2013.01)

(58) Field of Classification Search
CPC .. E05B 73/00; E05B 73/0005; E05B 73/0011; E05B 73/0017; E05B 73/0023; E05B 73/0029; E05B 73/0035; E05B 73/0041; E05B 73/0047; E05B 73/0058; E05B 73/0064; E05B 73/007; E05B 73/0076; E05B 73/0082; E05B 73/0094; E05B 67/00; E05B 67/003; E05B 67/006; E05B 67/02; E05B 67/04; E05B 67/06; E05B 67/063; E05B 67/08; E05B 67/22; E05B 67/24; E05B 67/28; E05B 67/32; E05B 67/36; E05B 67/383; F16B 2/00; F16B 2/005; F16B 2/02; F16B 2/04; F16B 2/06; F16B 2/10; F16B 2/12; F16B 2/16; F16B 5/00; F16B 5/004; F16B 5/0056; F16B 5/006; F16B 5/0064; F16B 5/0068; F16B 5/0076; F16B 5/06; F16B 5/0657
USPC ............................................ 70/20
See application file for complete search history.

(56) References Cited

U.S. PATENT DOCUMENTS

| | | | | |
|---|---|---|---|---|
| 3,953,914 | A * | 5/1976 | Huber | B24D 7/16 492/40 |
| 5,582,044 | A * | 12/1996 | Bolich | E05B 73/007 224/315 |
| 5,706,680 | A * | 1/1998 | Wroble | E05B 73/00 441/74 |
| 9,115,513 | B1 * | 8/2015 | Cayouette | E05B 73/0005 |

* cited by examiner

*Primary Examiner* — Nathan Cumar
(74) *Attorney, Agent, or Firm* — Morgan Law Offices, PLC (57) ABSTRACT

A lockable clamping device for securing an object on a mounting surface is disclosed herein. The lockable clamping device comprises a first tab configured to extend over the object at one side. A second tab is engageable with the first tab and configured to extend over the object at another side. A lock tab facilitates assembly of a locking device to interlock the first and second tabs, thereby securing the object on the mounting surface.

7 Claims, 7 Drawing Sheets

LOCKABLE CLAMPING DEVICE

CROSS-REFERENCE TO RELATED APPLICATIONS

This application claims the benefit of provisional patent application Ser. Nos. 63/237,846 and 63/334,253, filed Aug. 27, 2021, and Apr. 25, 2022, respectively, the subject matter of each of which is incorporated herein by reference.

TECHNICAL FIELD

The present disclosure relates to a clamping device having a lockable configuration.

BACKGROUND

As gasoline prices continue to soar, stealing gasoline has become a very attractive endeavor for thieves. A common scenario is to siphon gasoline from a vehicle's tank or take containers filled with fuel. Regarding the latter, particularly vulnerable to theft are vehicles carrying fuel containers mounted to the outside body.

A popular style of fuel container includes a slot in the center portion of the container. A mounting device is fixably attached to the vehicle and includes a threaded bolt extendable through the slot. A wing nut fitting the threaded bolt secures the fuel container onto the mounting device. To remove the fuel container, it is only necessary to turn the wing nut in a counterclockwise direction.

SUMMARY

A lockable clamping device for securing an object on a mounting surface is disclosed herein. The lockable clamping device comprises a first tab configured to extend over the object at one side. A second tab is engageable with the first tab and configured to extend over the object at another side. A lock tab facilitates assembly of a locking device to interlock the first and second tabs, thereby securing the object on the mounting surface.

The lockable clamping device is useable in conjunction with a lock for securing an object on a mounting surface.

In a non-limiting embodiment, the object is a mount to hold a fuel container having a centrally configured walled slot for receiving the mount therein, wherein the mount is mounted to the mounting surface.

In a non-limiting embodiment, the mount includes a threaded screw for receiving a wingnut therein to secure the fuel container.

In a non-limiting embodiment, the object is a mount to hold something other than a fuel container.

In a non-limiting embodiment, the first tab comprises a first section having a base wall and a pair of extensions extending from the longitudinal edges of the base wall. The base wall includes a slot configured substantially centrally; and hook protrusions extending from a first lateral edge of the base wall. A second section extends from the first section, and the second section has an L-shaped configuration. A third section extends substantially orthogonally from an edge of the second section, wherein the third section includes a first locking hole.

In a non-limiting embodiment, the second tab comprises an L-shaped base wall having a first edge and a second edge; an engagement flange extending from the first edge, the engagement flange includes at least one aperture formed thereon, the at least one aperture configured to engage with the hook protrusions of the first section; and a locking section extending from the second edge, wherein the locking section includes a second locking hole, wherein the second locking hole is configured to align with first locking hole subsequent to assembly.

In a non-limiting embodiment, the lock tab has a U-shaped configuration and includes a pair of third locking holes, wherein the pair of third locking holes is configured to align with the first locking hole and the second locking hole for facilitating assembly of the locking device therein.

In a non-limiting embodiment, the locking device is a padlock.

DETAILED DESCRIPTION OF EXAMPLE EMBODIMENTS

Example embodiments of the disclosure now will be described more fully hereinafter with reference to the accompanying drawings, in which example embodiments are shown. The concepts discussed herein may, however, be embodied in many different forms and should not be construed as limited to the example embodiments set forth herein; rather, these embodiments are provided so that this disclosure will be thorough and complete, and will fully convey the scope to those of ordinary skill in the art. Like numbers refer to like elements but not necessarily the identical elements throughout.

Figure 1:
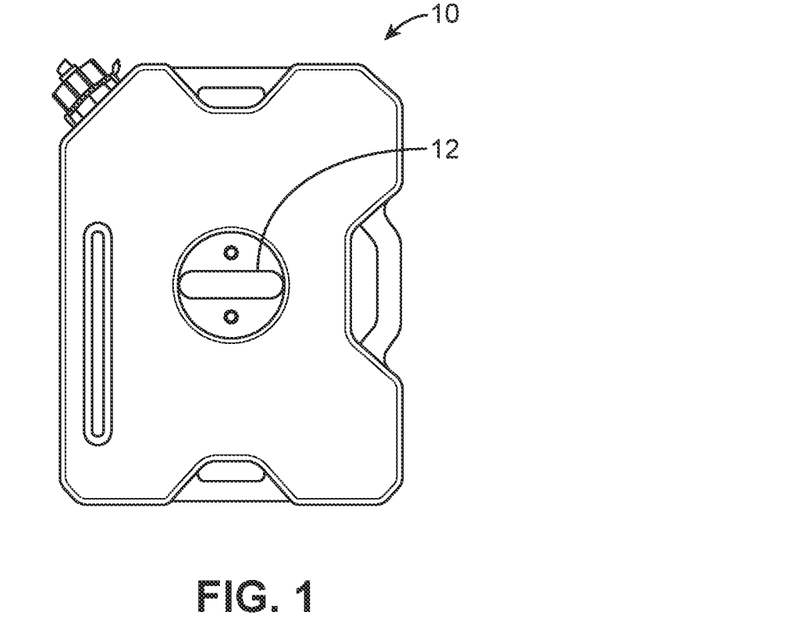
FIG. 1 illustrates a schematic view of a typical mountable fuel container.

Referring to FIG. 1, a schematic view of a common fuel container 10 is illustrated. The present disclosure relates to a lockable clamp that can be used in conjunction with a padlock to secure an object, such as, but not limited to, the fuel container 10 to a mounting surface, where the mounting surface may be any surface, e.g., a car body. In the illustrated example, the fuel container 10 includes a centrally configured walled slot 12. The centrally configured walled slot 12 is provided for facilitating the use of a mount 20 (as seen in FIG. 2) for mounting the fuel container 10 to the mounting surface.

Figure 2:
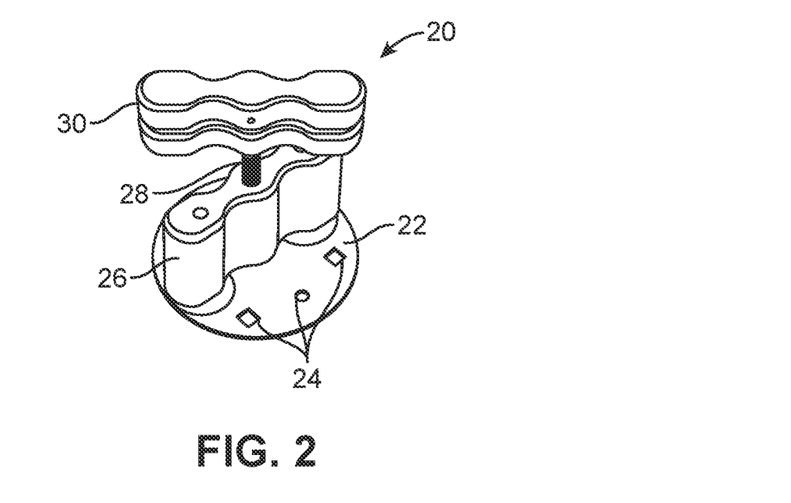
FIG. 2 illustrates a perspective view of a device used for mounting the fuel container of FIG. 1 on a mounting surface.

Referring to FIG. 2, a perspective view of the mount 20 used for mounting the fuel container 10 to the mounting surface, is illustrated. The mount 20 includes a base 22 that includes apertures 24 for facilitating securing of the base 22 to the mounting surface. The securing may be performed via fasteners, in accordance with one embodiment. The base 22 includes a protrusion 26 that extends substantially vertically from the base 22. The base 22 has a shape complementary to the shape of the centrally configured walled slot 12 of the fuel container 10. More specifically, after the base 22 is secured to the mounting surface, the fuel container 10 is then slid over the protrusion 26 such that the centrally configured walled slot 12 slides over the protrusion 26 to support the fuel container 10 thereon.

The mount 20 further comprises a threaded screw 28 protruding from the protrusion 26. The threaded screw 28 is configured to receive thereon a wingnut 30. Once the fuel container 10 is slid onto the protrusion 26 via the centrally configured walled slot 12, the wingnut 30 then provides secure placement to the fuel container 10 on the protrusion 26.

Figure 3:
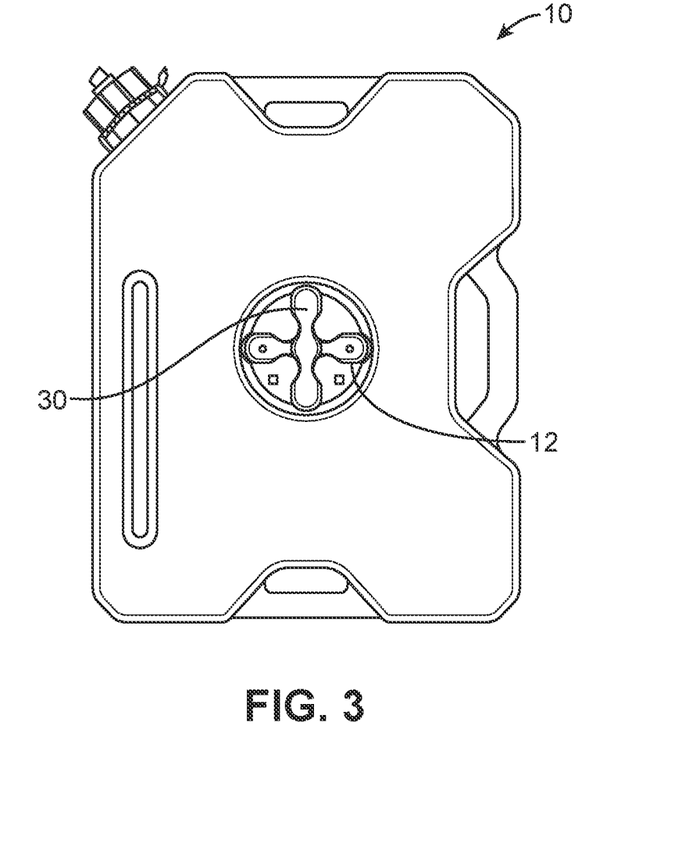
FIG. 3 illustrates a schematic view depicting the use of the device for mounting the fuel container.

Referring to FIG. 3, a schematic view depicting the use of the mount for mounting the fuel container 10, is illustrated. The wingnut 30 facilitates the secure placement of fuel container 10 on the protrusion 26. For removing the fuel container 10, one simply needs to turn the wingnut 30 and remove the fuel container 10. As such, the theft of fuel container 10 is a serious possibility given the ease with which one can remove fuel container 10 from the mount 20. To this end, the present invention envisages a lockable clamping device used in conjunction with a lock for preventing the theft of objects like fuel containers.

Figure 4:
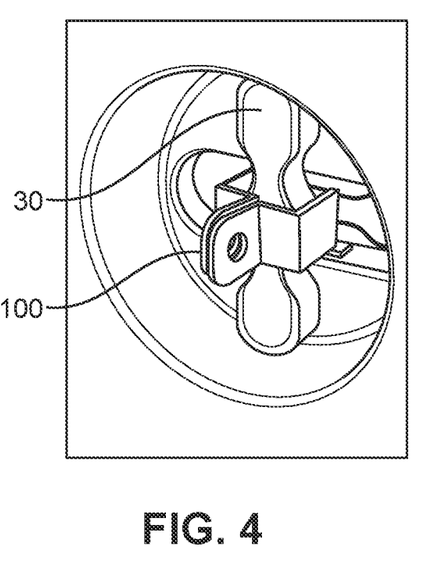
FIG. 4 illustrates a perspective view depicting a lockable clamping device assembled on the mount for facilitating locking of the fuel container, according to a first embodiment of the present invention.
Figure 5:
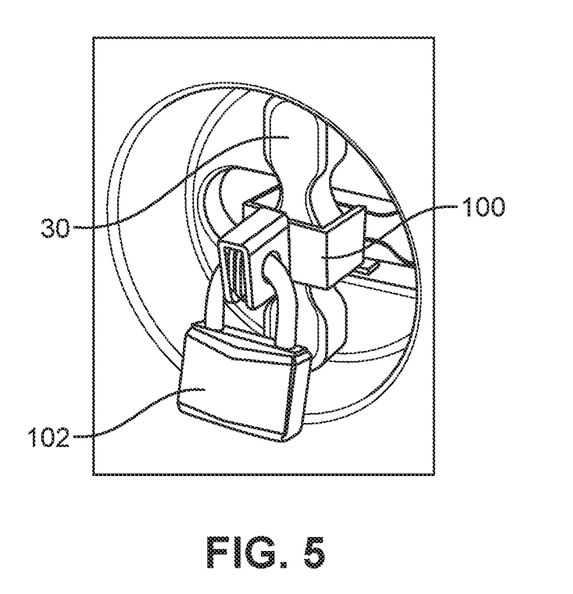
FIG. 5 illustrates a perspective view of the lockable clamping device of FIG. 4 having a padlock assembled thereon.

Referring to FIG. 4, a perspective view depicting the lockable clamping device 100 assembled on the mount for facilitating locking of the fuel container, is illustrated. Referring to FIG. 5, a perspective view of the lockable clamping device 100 having a padlock 102 assembled thereon, is illustrated. As seen in FIG. 4 and FIG. 5, the clamping device 100, in accordance with an embodiment of the present disclosure, is assembled onto the wingnut 30. More specifically, the lockable clamping device 100 restricts the rotational movement of the wingnut 30. As the rotational movement of the wingnut 30 is restricted via the usage of the lockable clamping device 100 and the padlock 102, the possibility of the fuel container is drastically reduced.

Figure 6:
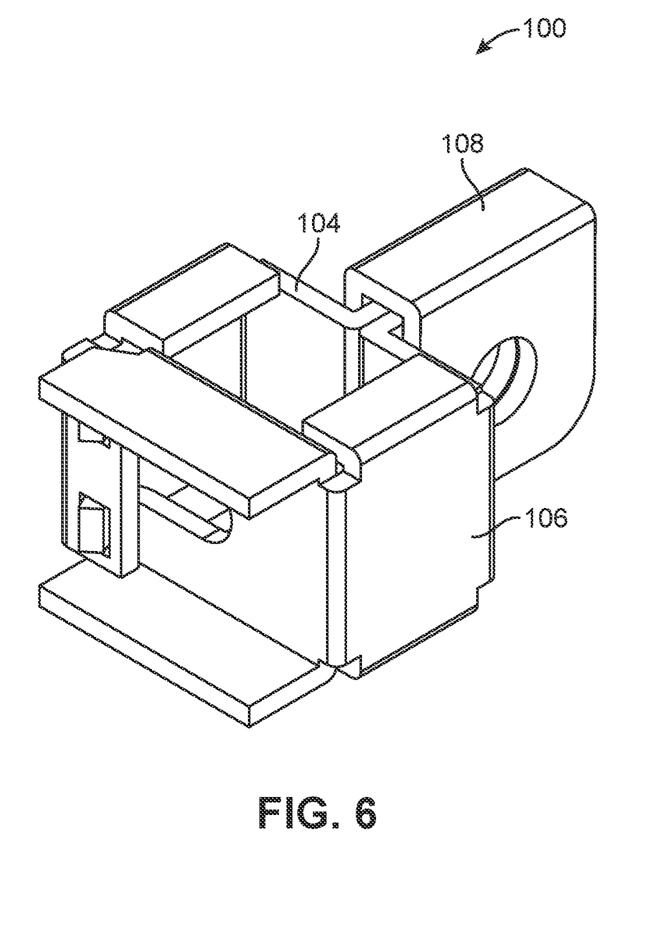
FIG. 6 illustrates a perspective view of the lockable clamping device, according to the first embodiment of the present invention.
Figure 7:
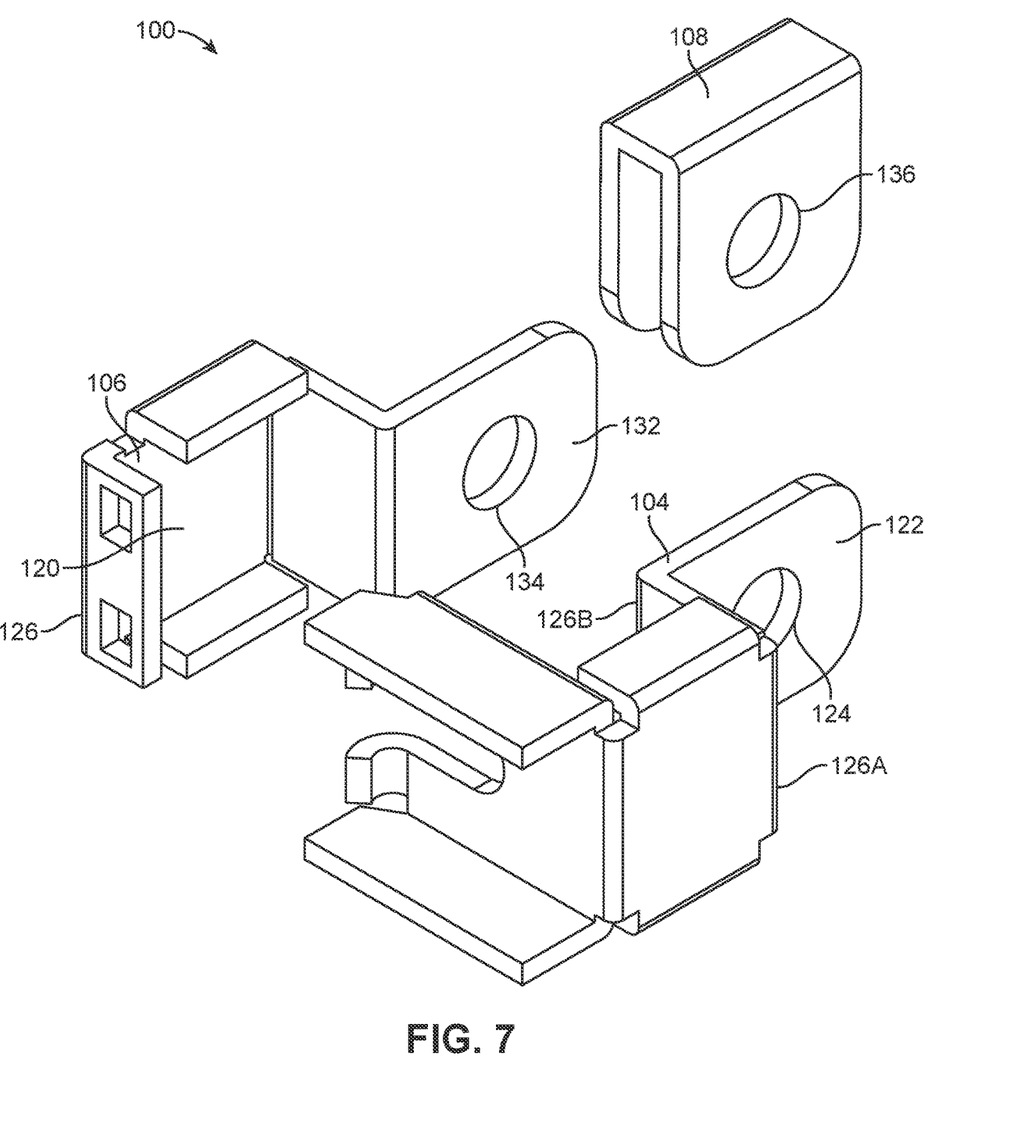
FIG. 7 illustrates an exploded view of the lockable clamping device of FIG. 6.

Referring to FIG. 6, a perspective view of the lockable clamping device 100, is illustrated. Referring to FIG. 7, an exploded view of the lockable clamping device 100, is illustrated. As seen in FIG. 6 and FIG. 7, the lockable clamping device 100 (hereinafter interchangeably referred to as clamping device 100) comprises a first tab 104 configured to extend over the object to be locked at one side. According to the present disclosure, the object may be the wingnut 30, the rotation of which is restricted via the clamping device 100. A second tab 106 is engageable with the first tab 104 and configured to extend over the object at another side. As mentioned above, the object may be the wingnut 30. A lock tab 108 facilitates assembly of the locking device 102 (interchangeably referred to as padlock 102) to interlock the first and second tabs 104, 106, thereby securing the object on the mounting surface. In one embodiment, the mounting surface may be a wall of a vehicle body.

Figure 8:
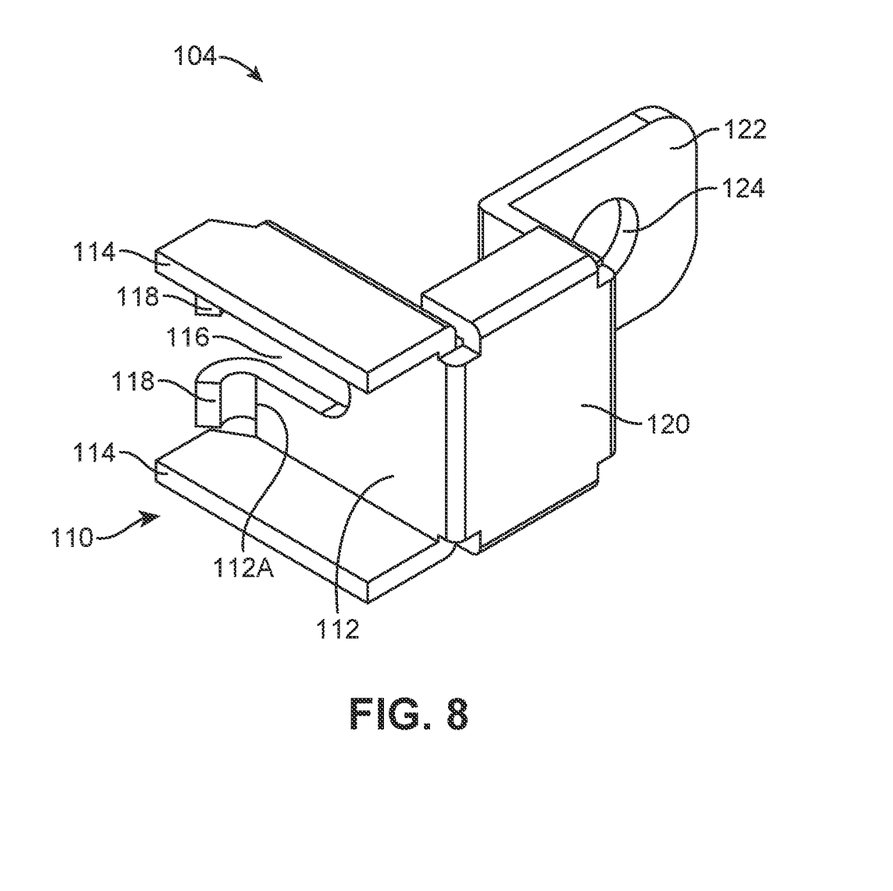
FIG. 8 illustrates a perspective view of a first tab used in the lockable clamping device, according to a first embodiment of the present invention.

Referring to FIG. 8, a perspective view of the first tab 104 used in the lockable clamping device 100, is illustrated. In a non-limiting embodiment, the first tab 104 comprises a first section 110 having a base wall 112 and a pair of extensions 114 extending from longitudinal edges of the base wall 112. In an embodiment, the base wall 112 includes a slot 116 for accommodating the threaded screw 28 on which the wingnut 30 is assembled. More specifically, the slot 116 allows the first section 110 to slide across the threaded screw 28 and the wingnut 30 to engage with the second tab 106 present on the other side of the threaded screw 28 and the wingnut 30. For facilitating the engagement with the second tab 106, the first tab 104 includes hook protrusions 118 extending from a first lateral edge 112A of the base wall 112.

The first tab 104 further comprises a second section 120 that extends from the first section 110. The second section 120 has an L-shaped configuration. A third section 122 extends substantially orthogonally from an edge 120A of the second section 120, wherein the third section 122 includes a first locking hole 124. The first locking hole 124 is configured on the first tab 104 for facilitating the reception of the locking device 102 therein. As mentioned previously, the locking device 102 may be a padlock. In an embodiment, the first tab 104 may be made of a metallic material. In another embodiment, the first tab 104 may be made of a non-metallic material including wood, plastic, and the like.

Figure 9:
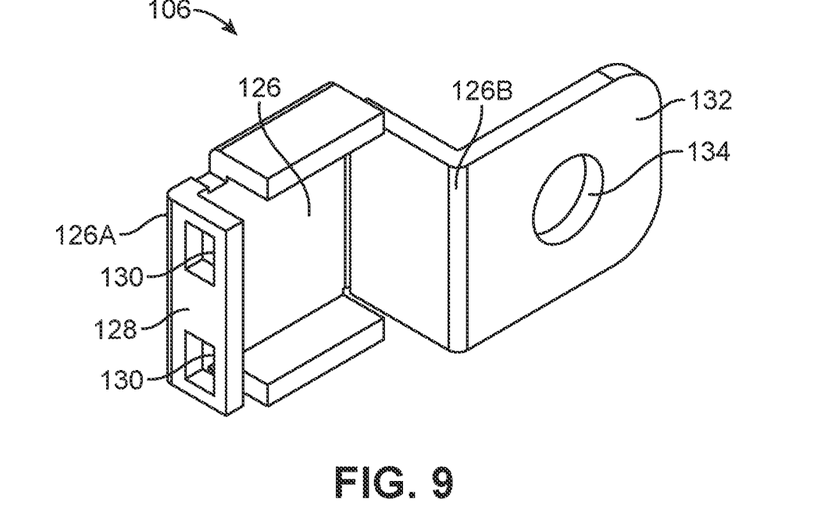
FIG. 9 illustrates a perspective view of a second tab used in the lockable clamping device, according to a first embodiment of the present invention.

Referring to FIG. 9, a perspective view of the second tab 106 used in the lockable clamping device 100, is illustrated. The second tab 106 comprises an L-shaped base wall 126 having a first edge 126A and a second edge 126B. An engagement flange 128 extends from the first edge 126A. The engagement flange includes at least one aperture 130 formed thereon, wherein the at least one aperture 130 is configured to engage with the hook protrusions 118 of the first section 110 of the first tab 104. A locking section 132 extends from the second edge 126B and includes a second locking hole 134, wherein the second locking hole 134 is configured to align with the first locking hole 124 subsequent to assembly over the mount 20, as seen in FIG. 4 and FIG. 5. In an embodiment, the at least one aperture 130 has a rectangular-shaped configuration, configured for receiving therein the rectangular shaped hook protrusions 118, as seen in FIG. 8 and FIG. 9.

It is to be noted that the apertures 130 and the hook protrusions 118 may have other cross sections as well, including square, circular, polygonal, geometrical, and non-geometrical shapes. Although in the present disclosure the number of apertures 130 and hook protrusions 118 is two, other configurations of the apertures 130 and the hook protrusions 118 having more than two apertures 130 or less than two apertures 130 are well within the ambit of the present disclosure.

Figure 10:
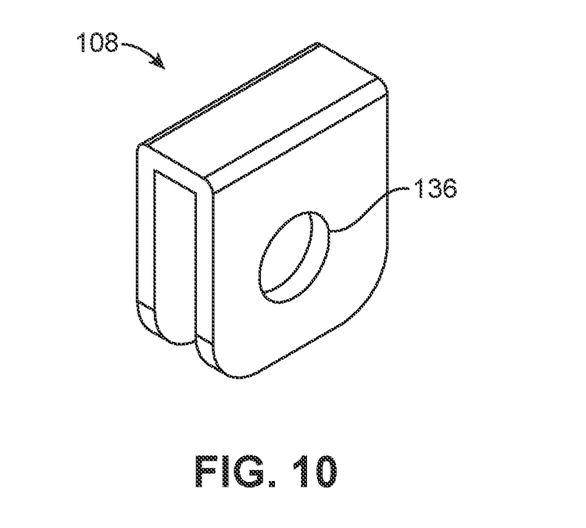
FIG. 10 illustrates a perspective view of a lock tab used in the lockable clamping device, according to a first embodiment of the present invention.

Referring to FIG. 10, a perspective view of the lock tab 108 used in the lockable clamping device 100, is illustrated. The lock tab 108 has a U-shaped configuration and includes a pair of third locking holes 136, wherein the pair of third locking holes 136 is configured to align with the first locking hole 124 and the second locking hole 134 for facilitating assembly of the locking device 102 therein.

The usage of the clamping device 100 is described hereinafter. The first tab 104 and the second tab 106 are fitted together such that the first tab 104 is on one side of the wingnut 30 and the second tab 106 is on the other side of the wingnut 30. The slot 116 allows the placement of the first tab 104 such that the first section 110 extends beyond the wingnut 30 and the threaded screw 28 towards the other side of the wingnut 30 and the threaded screw 28.

The second tab 106 is then placed on the other side of the wingnut 30. The apertures 130 of the second tab 106 are fitted with the hook protrusions 118. The fitment of the hook protrusions 118 with the apertures 130 provides a first clamping feature to the clamping device 100. Once the hook protrusions 118 and the apertures 130 are assembled, the locking section 132 of the second tab 106 aligns with the third section 122 of the first tab 104. The alignment of the locking section 132 with the third section 122 causes the alignment of the first locking hole 124 and the second locking hole 134. The lock tab 108 is configured to fit over the aligned locking section 132 and the third section 122, thereby aligning the first locking hole 124 and the second locking hole 134 with the pair of third locking hole 136. The alignment of the first locking hole 124, the second locking hole 134, and the pair of third locking hole 136 facilitates the fitment of the padlock 102 therein, thereby locking the rotational movement of the wingnut 30.

As seen in FIG. 4 and FIG. 5, the clamping device 100 in the present disclosure is used for locking a fuel container on a vehicle wall. However, the application of the clamping device 100 is not limited to the locking of fuel containers and can be used for locking other objects as well.

An advantageous aspect of the clamping device 100 is that the clamping device 100 has a simple design that is easy to manufacture. Another advantageous aspect of the clamping device 100, by locking the rotational movement of the wingnut 30, one is required to unlock the locking device 102 for dismounting the fuel container from the vehicle wall. Therefore, the probability of the fuel container being stolen is reduced to a great extent.

Although the features, functions, components, and parts have been described herein in accordance with the teachings of the present disclosure, the scope of coverage of this patent is not limited thereto. On the contrary, this patent covers all embodiments of the teachings of the disclosure that fairly fall within the scope of permissible equivalents.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

Example embodiments of the disclosure now will be described more fully hereinafter with reference to the accompanying drawings, in which example embodiments are shown. The concepts discussed herein may, however, be embodied in many different forms and should not be construed as limited to the example embodiments set forth herein; rather, these embodiments are provided so that this disclosure will be thorough and complete, and will fully convey the scope to those of ordinary skill in the art. Like numbers refer to like elements but not necessarily the same or identical elements throughout.

What is claimed is:

1. A lockable clamping device, comprising:
    a first tab configured to extend over an object at one side;
    a second tab engageable with the first tab, the second tab configured to extend over the object at another side; and
    a lock tab for facilitating assembly of a locking device to interlock the first and second tabs, thereby securing the object on a mounting surface;
    wherein the object is a mount to hold a fuel container having a centrally configured walled slot for receiving the mount therein, wherein the mount is mounted to the mounting surface.

2. The lockable clamping device of claim 1, wherein the mount includes a threaded screw for receiving a wingnut therein to secure the fuel container.

3. The lockable clamping device of claim 2, wherein the first tab comprises:
    a first section having a base wall and a pair of extensions extending from longitudinal edges of the base wall, wherein the base wall includes:
    a slot configured substantially centrally; and
    hook protrusions extending from a first lateral edge of the base wall;
    a second section extending from the first section, the second section having an L-shaped configuration; and
    a third section extending substantially orthogonally from an edge of the second section, wherein the third section includes a first locking hole.

4. The lockable clamping device of claim 3, wherein the second tab comprises:
    an L-shaped base wall having a first edge and a second edge;
    an engagement flange extending from the first edge, the engagement flange includes at least one aperture formed thereon, the at least one aperture configured to engage with the hook protrusions of the first section; and
    a locking section extending from the second edge, wherein the locking section includes a second locking hole, wherein the second locking hole is configured to align with first locking hole subsequent to assembly.

5. The lockable clamping device according to claim 4, wherein the lock tab has a U-shaped configuration and includes a pair of third locking holes, wherein the pair of third locking holes is configured to align with the first locking hole and the second locking hole for facilitating assembly of the locking device therein.

6. The lockable clamping device according to claim 4, wherein the at least one aperture has a rectangular-shaped configuration.

7. The lockable clamping device according to claim 5, wherein the locking device is a padlock.

* * * * *